(12) United States Patent
Pullen et al.

(10) Patent No.: US 6,424,069 B1
(45) Date of Patent: Jul. 23, 2002

(54) ROTARY ELECTRICAL MACHINES

(75) Inventors: Keith Robert Pullen, Acton; Mohammad Reza Etemad, East Sheen; Arnoldo Fenocchi, Wimbledon, all of (GB)

(73) Assignee: The Turbo Genset Company Limited (GB)

( * ) Notice: Subject to any disclaimer, the term of this patent is extended or adjusted under 35 U.S.C. 154(b) by 0 days.

(21) Appl. No.: 09/468,997

(22) Filed: Dec. 21, 1999

Related U.S. Application Data

(60) Division of application No. 08/978,703, filed on Nov. 26, 1997, now Pat. No. 6,104,111, which is a continuation-in-part of application No. PCT/GB96/01292, filed on May 31, 1996.

(30) Foreign Application Priority Data

May 31, 1995 (GB) .............................. 9510994

(51) Int. Cl.$^7$ .............................. H02K 3/26; H02K 1/30

(52) U.S. Cl. .............................. 310/156.38; 310/156.56; 310/156.28; 310/268; 310/DIG. 6

(58) Field of Search .............................. 310/156, 179, 310/184, 268, DIG. 6, 156.23, 156.38, 156.53

(56) References Cited

U.S. PATENT DOCUMENTS

| | | | | | |
|---|---|---|---|---|---|
| 3,355,645 | A | * | 11/1967 | Kawa Kami et al. | ... 310/156 X |
| 3,809,253 | A | * | 5/1974 | Mercer, Jr. | .................... 414/18 |
| 4,507,637 | A | * | 3/1985 | Hayashi | ........................ 336/65 |
| 4,677,332 | A | * | 6/1987 | Heyraud | ...................... 310/184 |
| 4,855,630 | A | * | 8/1989 | Cole | .......................... 310/156 |
| 4,866,321 | A | * | 9/1989 | Blanchard et al. | .......... 310/112 |
| 5,644,183 | A | * | 7/1997 | Van Loenen et al. | ....... 310/268 |

* cited by examiner

Primary Examiner—Nestor Ramirez
Assistant Examiner—Judson H. Jones
(74) Attorney, Agent, or Firm—Kaplan & Gilman, LLP

(57) ABSTRACT

A rotary electrical machine (1) has at least one stator (23). The stator is provided with at least one radial channel (107) for ducting cooling air. The channel (107) extends between a first position (113) at or substantially near the rim (109) of a winding region of the stator (23) and a second position (119) at or substantially near the center (51) of the winding region. The machine (1) has cooling means (91–97) for causing cooling air to enter the radial channel (107) via the second position (119) and exit via the first position (113). The stator may have electrical windings arranged as coil sectors (183–197) disposed substantially equi-angularly in a generally circular pattern. At least some of the coil sectors are wound in a generally spiral fashion when viewed axially. A rotor (13), for the machine may have a plurality of equi-angularly spaced magnets (127), which are generally circular but with a cut-away portion, when viewed axially.

7 Claims, 4 Drawing Sheets

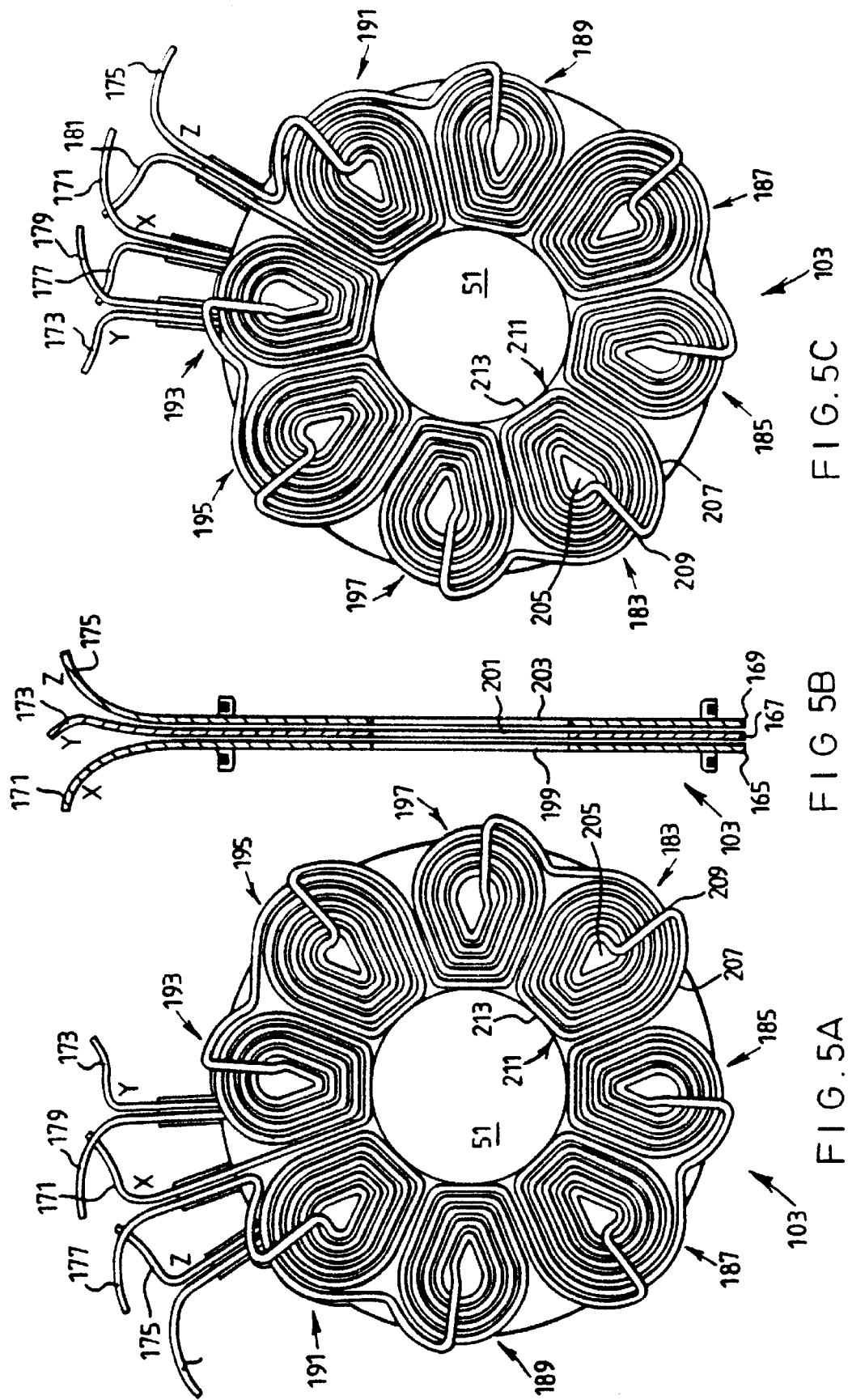

ROTARY ELECTRICAL MACHINES

RELATED APPLICATIONS

This application is a division of application Ser. No. 08/978,703, filed Nov. 26, 19997 now U.S. Pat. No. 6,104, 111 and a continuation in part of Application Ser. No. PCT/GB96/01292 filed May 31, 1996 and International Application PCT/GB96/01292.

The present invention relates to rotary electrical machines such as electrical generators and electric motors and to particularly advantageous components for use in such machines.

UK Patent Specification GB-A-2 222 031 describes an axial field electrical generator capable of operation at very high speeds. However, certain features of this known design have been perceived to have some drawbacks. In response to these, our UK patent specification No. GB-A-2 261 327 describes and claims certain improvements in rotary electrical machines. Both these known designs employ rotors having substantially equi-angularly spaced magnets retained by a retention ring and stators provided with respective electrical windings.

The generator described in GB-A-2 222 031 employs air cooling for the stators. The air is directed by means of radial channels entering at the rim. The channels conduct air towards the center of the stators and back again to the rim. As a result, on the return path the air is already hot and so performs little cooling. Hence this arrangement means that the components of the rotors, especially the magnets and the temperature-critical retention ring are subjected to air which has already been heated due to passage through the stators.

On the other hand, GB-A-2 261 327 discloses a stator comprising at least one radial channel for ducting of cooling air. The channel has an entrance at or substantially near the rim of the stator and an exit at or substantially near the centre of the stator.

The latter cooling arrangement has now been improved, in accordance with a first aspect of the present invention, by provision of a rotary electrical machine comprising at least one stator and at least one adjacent rotor, a space being provided between said stator and said rotor, the stator being provided with at least one set of at least two substantially parallel radial channels for ducting of cooling air, said set of radial channels extending between a first position at or substantially near the rim of a winding region of the stator and a second position at or substantially near the centre of the winding region, the electrical machine further comprising cooling means for causing cooling air to pass through said set of radial channels and to pass through said space between said stator and said rotor.

The cooling system of the first aspect of the present invention has the advantage that more surface area for cooling inside the stator. This is due to the electrical windings described below with reference to the third aspect of the present invention of reduction in windage losses due to reduction in pressure in the stator-rotor gap.

The cooling means may be arranged to cause the cooling air to enter the set of radial channels via the first position and exit via the second position. In this case, the cooling air preferably passes through the space between the stator and the rotor after exiting the set of radial channels.

Alternatively, the cooling means may be arranged to cause the cooling air to enter the set of radial channels via the second position and exit via the first position. In this case, the cooling air preferably passes through the space between the stator and the rotor before entering the set of radial channels.

This means that the rotor components, especially the ring and magnets are cooled first with the highest temperatures occurring only in the stationary stator coils which can withstand higher temperature due to the absence of mechanical stresses.

The cooling means may be arranged to provide pressurised cooling air to the at least one set of radial channels at one position to blow the cooling air through the set of radial channels to the other position.

Alternatively, the cooling means could be arranged to subject the set of radial channels at one position to a reduced pressure to suck the cooling air through the set of radial channels from the other position.

The machine may comprise a drive shaft, and the cooling means may then comprise an evacuation compressor actuable by means of the drive shaft. The cooling means may, on the other hand, comprise a pump, for example, a remote pump. The cooling means may alternatively comprise a fan.

The stator is preferably provided with electrical windings and the at least one rotor preferably has a plurality of substantially equi-angularly spaced magnets.

The set of radial channels can follow a substantially straight path or a curved or meandering path between the first and second positions, although the general direction of the set of channels will be radial.

In accordance with a second aspect of the present invention, there is provided a rotary electrical machine comprising at least one stator, the stator being provided with at least one radial channel for ducting of cooling air, said radial channel extending between a first position at or substantially near the rim of a winding region of the stator and a second position at or substantially near the centre of the winding region, the electrical machine further comprising cooling means for causing cooling air to enter the radial channel via the second position and exit via the first position.

The cooling means may be arranged to provide pressurised cooling air to the at least one radial channel at the second position to blow the cooling air through the radial channel to the first position. Alternatively, the cooling means may be arranged to subject the first position of the at least one radial channel to a reduced pressure to suck the cooling air through the radial channel from the second position.

The cooling means may comprise a pump or a fan. Alternatively, the machine may comprise a drive shaft and the cooling means may comprise an evacuation compressor actuable by the drive shaft.

The machine is preferably provided with a respective space between the at least one stator and at least one adjacent rotor, the cooling means being arranged to cause cooling air to pass through the space between the stator and the rotor. The cooling air preferably passes through the space between the stator and the rotor before entering the radial channel.

The radial channel may follow a substantially straight path between the first and second positions. Alternatively, the channel may follow a meandering path between the first and second positions, although the general direction of the channel will be radial.

The at least one stator preferably comprises electrical windings, and the at least one adjacent rotor preferably comprises a plurality of substantially equi-angularly spaced magnets.

The stator is preferably provided with at least one set of radial channels, each set comprising at least two substantially parallel radial channels. In fact, the stator may comprise three layers of electrical windings, at least one radial channel of a set of radial channels being disposed between adjacent windings.

The stator described in GB-A-2 222 031 has windings which are standard wave windings as conventionally used in electrical machines. That is to say, the respective windings for each phase are in separate overlapping planes.

To assist miniaturisation, the arrangement described in GB-A-2 261 327 has a stator comprising a plurality of windings for various phases of electric current, the windings being substantially in the same plane.

The machine described hereinbelow as embodiments of the first and second aspects of the present invention contains a stator which has a particularly advantageous arrangement of electrical windings. Thus, a third second aspect of the present invention provides a stator for an axial field electrical machine, the stator comprising electrical windings arranged as coil sectors disposed substantially equi-angularly in a general circular pattern, wherein at least some of the coil sectors are wound in a generally spiral fashion when viewed in the direction of axis of symmetry of the said generally circular pattern.

A stator constructed in the form of the third aspect of the present invention facilitates simpler manufacture, a greater surface area being provided for cooling, and a greater output than the wave-winding arrangements described in GB-A-2 222 031 and GB-A-2 262 327. Moreover, it allows more flexibility in the choice of magnet shape.

Preferably, each of the coil sectors is wound in a generally spiral fashion. The term "generally spiral fashion" includes the configuration of a pinched spiral, although a substantially regular spiral is also possible, as well as other minor distortions of the general spiral shape. In the case of a pinched spiral, the spiral shape may be pinched inwardly at its part closest to the centre of the generally circular pattern. Such a pinched part may have a flattened portion substantially facing the centre of the generally circular pattern.

The electrical windings may be provided with connections for receipt of, or output of, a three-phase electrical current. However, two-phase or other arrangements are also possible.

For the rotor, the machine described in GB-A-2 222 031 utilises a carbon fibre-reinforced hoop for retaining magnets in an angularly spaced arrangement. However, the rotor described in GB-A-2 261 327 has a retaining hoop formed from reinforced carbon fibres. The fibres extend around the hoop at a non-normal angle relative to the axis of symmetry of the hoop.

The preferred embodiments of an electrical machine described hereinbelow also discloses a particularly advantageous rotor. This rotor comprises, in accordance with a fourth aspect of the present invention, a plurality of magnets substantially equi-angularly spaced around an axis of rotation, at least some of said magnets being generally circular when viewed in the direction of the axis of rotation and having a cut-away portion.

The magnets for the rotor according to the fourth aspect of the present invention may, for example, be made by grinding the periphery of a conventional button magnet. In any event, the fourth aspect of the present invention reduces manufacturing costs when compared to cutting a special shape for small to medium production volumes, e.g. a special shape as disclosed in GB-A-2 222 031 or GB-A-2 261 327.

Preferably, each of the magnets is generally circular when viewed in the direction of axis of rotation and has a cut-away portion. Most preferably, the edge of each magnet which defines the cut-away portion is convexly curved.

As described hereinbelow with respect to the fourth aspect, the convexly curved edge of each magnet faces outwardly relative to the axis or rotation. The convexly curved edge has substantially the same degree of curvature as the periphery of the rotor. The magnets are reined by a retention hoop.

The present invention will now be explained in more detail by the following description of preferred embodiments and with reference to the accompanying drawings, in which:

in FIG. 1, along the line A—A;

FIG. 5A shows a plan view from one side, FIG. 5B shows an axial cross-section and FIG. 5C shows a plan view from the other side of the coil windings of one of the stators of the machine shown in FIGS. 1 and 2.

Figure 1:
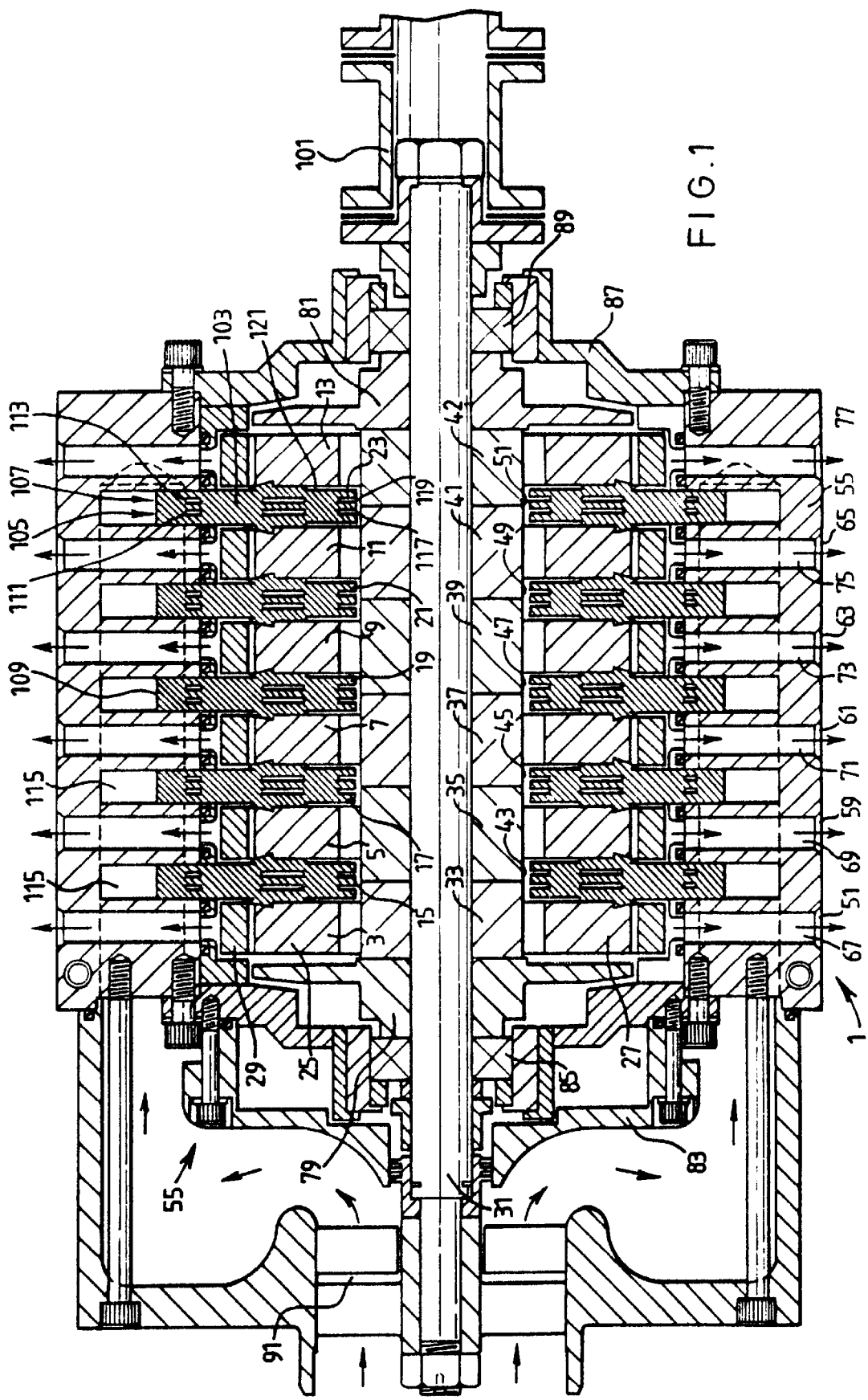
FIG. 1 shows an axial cross-section through an axial field electrical machine according to the first aspect of the present invention and comprising stators according to the third aspect of the present invention and rotors according to the fourth third aspect of the present invention.

In the axial machine 1 according to the invention, as shown in FIG. 1, each of six disc-shaped rotors 3, 5, 7, 9, 11, 13 is respectively alternately interleaved with five disc-shaped stators 15, 17, 19, 21, 23. The rotors each comprise a plurality of radially spaced magnets 25, 27, etc. The magnets are retained by respective hoops 29, etc. The rotors are mounted on a central drive shaft 31 by means of respective integral bosses 33, 35, 37, 39, 41, 42.

The drive shaft 31 passes through respective central stator openings 43, 45, 47, 49, 51. The stators are joined to form a unitary assembly block 55 so that each is provided with a plurality of radially arranged air holes 57, 59, 61, 63, 65, etc., communicating with respective peripheral air channels 67, 69, 71, 73, 75, 77, etc.

A closed path for the magnetic field resulting from the magnets 25, 27, etc., is maintained by keeper discs 79, 81 at either end of the machine.

The drive shaft 31 passes outwardly of the block 55 through a first casing end piece 83 having a first bearing 85 and through a second casing end piece 87 having a second bearing 89. After the drive shaft 31 emerges from the first end piece 83 it is connected to cooling fan 91.

After the drive shaft 31 emerges through the second end piece 87, it is connected to a coupling 101 for connecting it to another component such as a turbine (not shown).

The construction of each stator is substantially the same but for convenience, a description will be given only of the stator 23 which is adjacent the second end piece 87. Details of the means of stator cooling are also shown in FIG. 1. The stator windings will be explained her hereinbelow with reference to FIGS. 5A–5C.

Referring again to FIG. 1, the stator 23 comprises a winding assembly 103 provided with a plurality of radial channels 105, 107, etc., extending between the periphery 109 of the stator and the central opening 51. At the periphery 109, the channels 105, 107, etc., have respective inlets 111, 113, etc., which communicate with axial channels 115, etc., formed in the stator assembly block 55, to receive air from the cooling fan 91.

At the central opening 51, the radial stator channels 105, 107 have respective outlets 117, 119, etc., which communicate with the air channels 77 by means of spaces 121, etc., between each stator and its respective rotor 11, 13, etc.

In use, as the drive shaft 31 rotates, the cooling fan 91 forces air through the axial channels 115, etc., and thence through each inlet 111, 113, etc., of the stators 25, etc. The air exits through the outlets 117, 119, etc., and passes radially outwardly through the stator-rotor spaces 121, etc., over the magnets 33, etc., and the retention hoops 29, etc., before emerging through the peripheral air channels 77, etc., formed in the stator assembly block 55, finally emerging through exit air holes 67, etc. As mentioned above in this way, the cooling air cools the stators first, before passing over the magnets and retention hoops of the rotors. Moreover, the same effect can be achieved by drawing air from the air intake 97, by connecting the air holes 67, etc., to a remote pump. In principle, such a pump could also be connected to the drive shaft 31.

Figure 2:
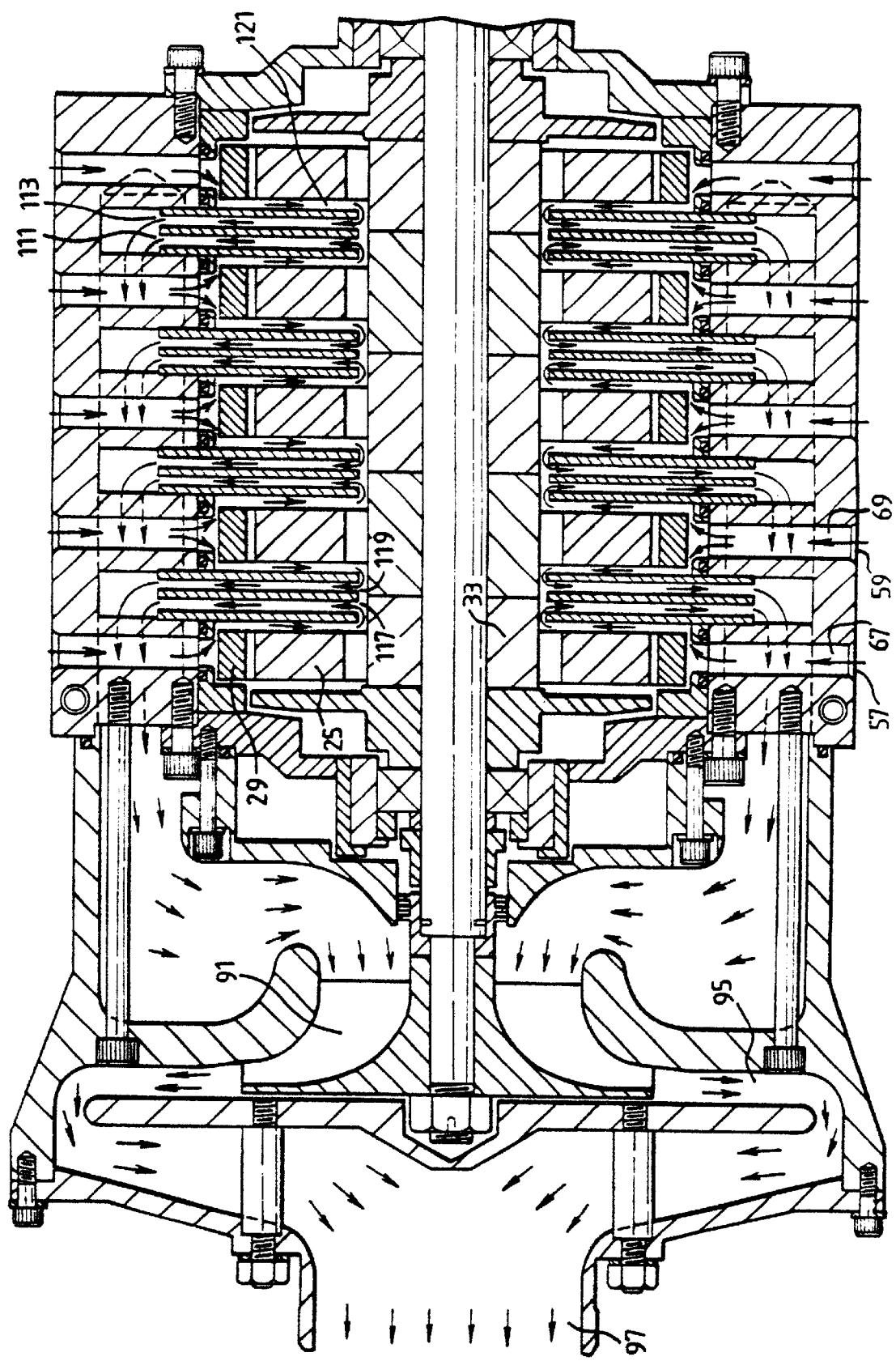
FIG. 2 shows the electrical machine of FIG. 1, having a manner of operation in accordance with the first and second aspects of the present invention.

The stator assembly shown in FIG. 2 of the drawings is structurally identical to that shown in FIG. 1. However, in this case, the evacuation compressor 91 causes air to be sucked into the peripheral air channels 69, etc. through the air holes 59, etc. The air flows through the air channels 69, etc. and thence through each of the channels formed by the rotor-stator spaces 121, etc., passing over the magnets 25, etc. and the retention hoops, 29, etc. The air then passes radially inwardly through the inlets 117, 119, etc. of the stators 23, etc. and exits through the outlets 111, 113, etc. The air passed through the diffuser 95, finally emerges from air outlet 97.

In this way, the cooling air cools the magnets 25, etc. and retention hoops 29, etc. of the rotors first, before passing through the radial channels in the stators and then being drawn away from the stator assembly.

Figure 3:
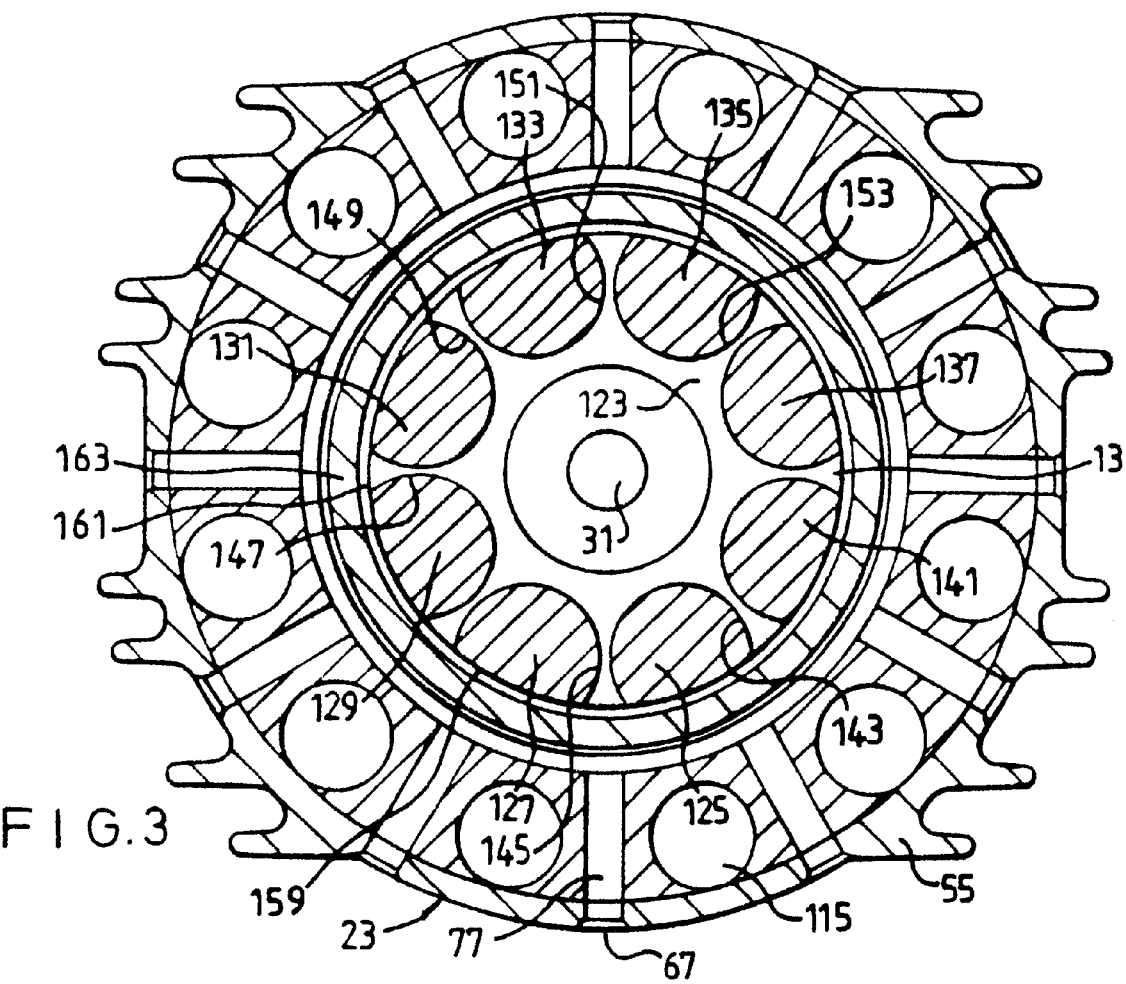
FIG. 3 shows a radial cross-section through the machine shown.
Figure 4:
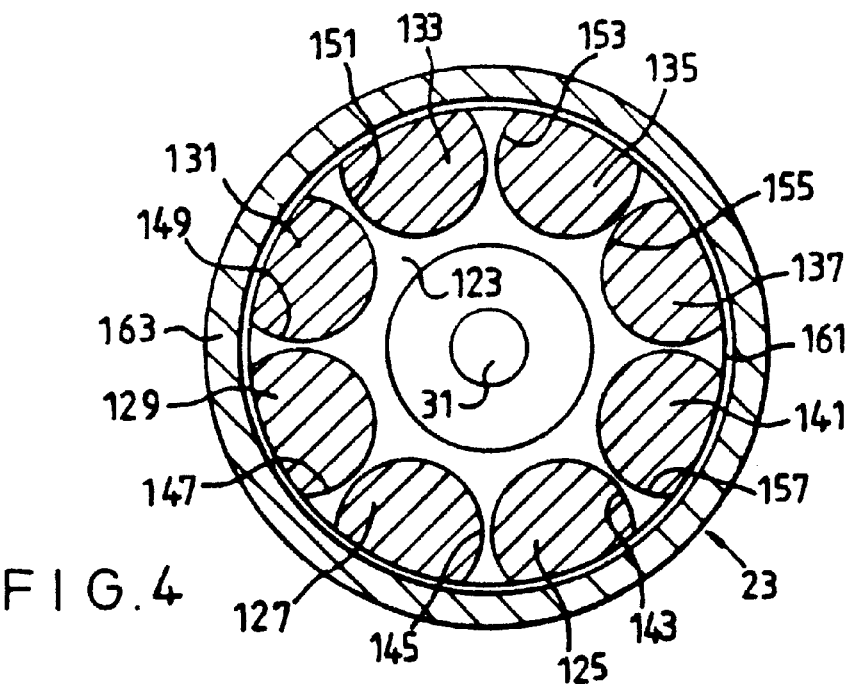
FIG. 4 shows a plan view of one of the rotors of the machine shown in FIGS. 1 and 2 together with a partial view of one of the stators thereof.

Referring now to FIGS. 3 and 4, each rotor has the same construction as the rotor 13 adjacent second end piece 87. This rotor, 13, etc., is in accordance with the third aspect of the present invention and comprises a generally annular spider 123 the centre of which is joined to the drive shaft 31. Eight equi-angularly spaced magnets 125, 127, 129, 131, 133, 135, 137, 139, 141 are disposed around the spider in respective holes 143, 145, 147, 149, 151, 153, 155, 157 therein, formed to correspond to the shapes of, and to receive the respective magnets.

In this example, each of the magnets 125, etc., has the same shape. However, this is not essential. For simplicity, reference is made only to one magnet 125. As viewed in the axial direction, it is circular in shape except for a cut-away portion defined by a convex edge 159, etc., contiguous with the periphery 161 of the spider 123. These magnets may be fashioned in this shape by taking conventional button magnets and grinding the periphery to produce the convex-edge 159, etc., defining the cut-away portion. The magnets are retained by a reinforced carbon fibre retention hoop 163 which is placed over the spider periphery 161, for example as described in GB-A-2 261 327.

Note that other shapes of magnet may be chosen to give improved output if the benefit outweighs the cost considerations.

The winding assembly of each stator is the same. Thus, for convenience, a description will be made here only of the assembly 103 of the stator 23 closest to the second end piece 87 and with reference to FIGS. 5A–5C.

The windings are made in three planes 165, 167, 169 overlapping relative to the axis and each is provided with a respective connection 171, 173, 175 (with respective counter-connections 177, 179, 181) for a three-phase electrical output (denoted X, Y, Z).

The windings are each formed into eight respective coil sectors 183, 185, 187, 189, 191, 193, 195, 197. It will be appreciated that each set of windings in the respective planes 165, 167, 169 are formed on or within respective laminar supports 199, 201, 203.

Each coil sector 183, etc., is substantially of similar shape. For convenience, this will be described here only with reference to one such sector 183. The sector is generally spiral in shape with the wiring spiralling from the middle 205 to the 207 thereof. The radially outermost part 209 adjacent the stator periphery 109 is generally rounded. The innermost part 211 adjacent the opening 51 is inwardly pinched but has a flat part 213 facing the opening.

In the light of this disclosure modifications of the described embodiment, as well as other embodiments, all within the scope of the present invention as defined by the appended claims, will now become apparent to persons skilled in the art.

What is claimed is:

1. A stator for an axial field electrical machine, the stator comprising electrical windings arranged as coil sectors disposed substantially equi-angularly in a generally circular pattern, wherein when viewed in the direction of the axis of symmetry of the said generally circular pattern at least some of the coil sectors are wound in a generally spiral fashion and wherein the winding continues from the centre of the coil sector across the spirals of the coil sectors to the next coil sector.

2. A stator according to claim 1, wherein each of said coil sectors is wound in a generally spiral fashion.

3. A stator according to claim 1, wherein said coil sectors wound in a generally spiral fashion are in the form of a pinched spiral.

4. A stator according to claim 3, wherein said pinched spiral is a spiral pinched at its part closest to the centre of the generally circular pattern.

5. A stator according to claim 4, wherein the pinched part has a flattened portion substantially facing the centre of the generally circular pattern.

6. A stator according to any of claims 1, wherein the electrical windings are provided with connections for receipt of, or output of, a three-phase electrical current.

7. A rotary electrical machine comprising at least one stator according to claim 1 and at least one rotor.

* * * * *